Figure 1:
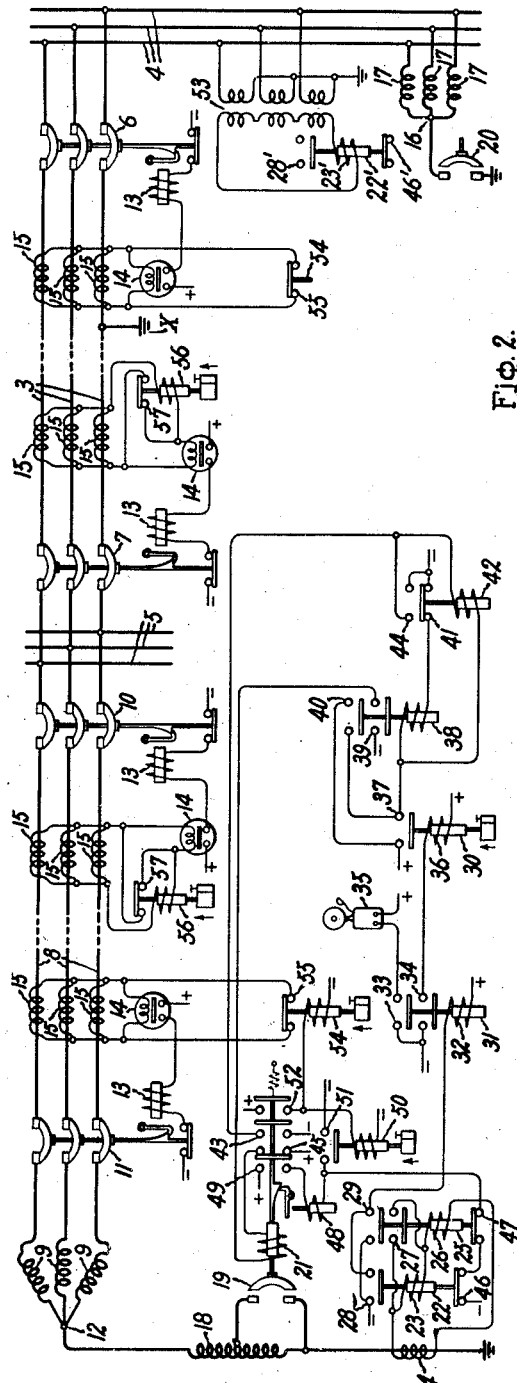

Oct. 7, 1941.     E. H. BANCKER     2,258,234
PROTECTION OF ALTERNATING CURRENT ELECTRIC SYSTEMS
Filed March 1, 1940

Inventor:
Elbert H. Bancker,
by Harry E. Dunham
His Attorney.

Patented Oct. 7, 1941

2,258,234

UNITED STATES PATENT OFFICE 2,258,234

PROTECTION OF ALTERNATING CURRENT ELECTRIC SYSTEMS

Elbert H. Bancker, Schenectady, N. Y., assignor to General Electric Company, a corporation of New York Application March 1, 1940, Serial No. 321,720

9 Claims. (Cl. 175—294)

My invention relates to improvements in the protection of alternating current electric systems and more particularly to ground fault protection of alternating current electric systems of the type wherein a fault to ground on a phase conductor of the system substantially increases the capacitance current to ground of the ungrounded phase conductors of the system.

A large percentage of the faults on alternating current electric systems involves, initially at least, only a single conductor to ground. Most of these are of a transient or arcing character. It is, therefore, desirable, whenever possible, to clear such faults without circuit breaker operations. Such arcing ground faults may be cleared by arc suppressing or ground fault neutralizing apparatus of the type disclosed in United States Letters Patent 1,537,371, issued May 12, 1925. Such apparatus by itself is effective only on alternating current electric systems of the type wherein a fault to ground on a phase conductor of the system substantially increases the capacitance current to ground of the ungrounded phase conductors of the system.

In such systems it is impractical, in case of faults which the ground fault neutralizer cannot suppress, to secure that selectivity of relay operation which will, in case of such faults, disconnect only the faulty portion of the system and yet maintain continuity of service on sound portions. This is in part due to insufficient fault current to insure the necessary discrimination within the sensitivity limits of the relays. Moreover, when selectivity is based on the use of ground fault directional relays, the variation in power factor at any point of the system, in dependence on the location of the fault even though the power factor may change in sign, is so small that it precludes the use of prearranged relay settings suitable for selective operation regardless of the fault location.

However, if a system is so arranged that one or more of its neutral points may be grounded to accord with a prearrangement of relay settings, then selectivity can be obtained because the factors which militate against the desired relay operation may be eliminated by the grounding of the system. In other words, the system set up, as far as the flow of ground fault current is concerned, is practically that for which prearranged settings within the discriminating ability of the relays are determined. Moreover, there is usually plenty of fault current with a large power factor variant for different fault locations. Accordingly, if after a predetermined time sufficient for the ground fault neutralizer to clear a transient fault, the fault still exists, it is desirable to put the system grounding connections in condition to correspond with the prearranged selectivity of the ground fault relays so that they may have an opportunity to clear the fault. In effecting this grounding it is, of course, desirable that the several grounding switches be closed as nearly together as possible. Since this is difficult to accomplish, the closing of one grounding switch must not occur before the closing impulse has been given to all the grounding switches. Otherwise, one or more may fail to close and thus prevent that grounding of the system for which the relays are set.

However, in systems which require the grounding of several neutral points, it may be difficult so to synchronize the closing of the grounding switches at these points that they close practically simultaneously to give throughout the system that distribution of current upon which the relay settings are based. Thus, if one grounding switch were to close ahead of the others, there would be more current in the system between this switch and the point of fault than would exist when all the switches are closed and less current in the faulty portion of the system. Under these conditions, the operating times of the different relays tend to become more nearly alike. Thus, while the relays on the faulty portion may operate first, relays elsewhere may not be enough slower to avoid closing their contacts before the circuit breakers in the faulty portion have isolated the fault. Correct relaying operation may also be hindered because, during the time in which current flows in the ground fault neutralizer and regardless of the location of the fault, a long line may have nearly as much residual current as exists for a fault at its far end after the grounding switches have closed. This makes it difficult for the relays to distinguish between these two conditions of operation since the amount and direction of flow of ground fault current may be so nearly alike in each case. There is, therefore, the possibility in some systems of interrupting continuity of service on sound sections, which must, of course, be eliminated.

If the ground fault relays operate correctly to clear the fault, the system should be returned to ground fault neutralizer operation with the minimum of delay so as to be ready for further faults. If the ground fault relays or the circuit breakers which they control fail to clear the fault, then, after a predetermined time of grounding, it is desirable to return to ground fault neutralizer operation since this will limit the flow of ground fault current so that system operation may continue until the fault is cleared by suitable manipulation of the system circuit breakers. In those cases where the fault is not cleared by the action of the ground fault neutralizers or the ground fault relays, it is important that for any one fault, grounding switches close and open only once. In other words, for any one fault, repetitions of these switching operations, sometimes referred to as pumping, should not occur.

One object of my invention is to provide an improved protective arrangement whereby, in case the ground fault neutralizing means fails to clear a fault within a predetermined time, the system is so grounded that its ground fault relays may function selectively in accordance with prearranged settings based on such grounding. A second object of my invention is to provide an improved protective arrangement whereby the system is restored to ground fault neutralizing operation as soon as a fault is cleared by the action of the ground fault relays and, after a predetermined time, if the ground fault relays fail to clear the fault. A third object of my invention is to provide an improved protective arrangement whereby for any one ground fault, not cleared by the ground fault neutralizing means, only one circuit closing and opening of the switching means used to establish the desired grounding can occur. A fourth object of my invention is to provide an improved protective arrangement for preventing operation of the ground fault relays until the system grounding corresponds to that for which the relays are set. These and other objects of my invention will hereinafter appear in more detail.

My invention will be better understood from the following description when considered in connection with the accompanying drawing, and its scope will be pointed out in the appended claims.

Figure 2:
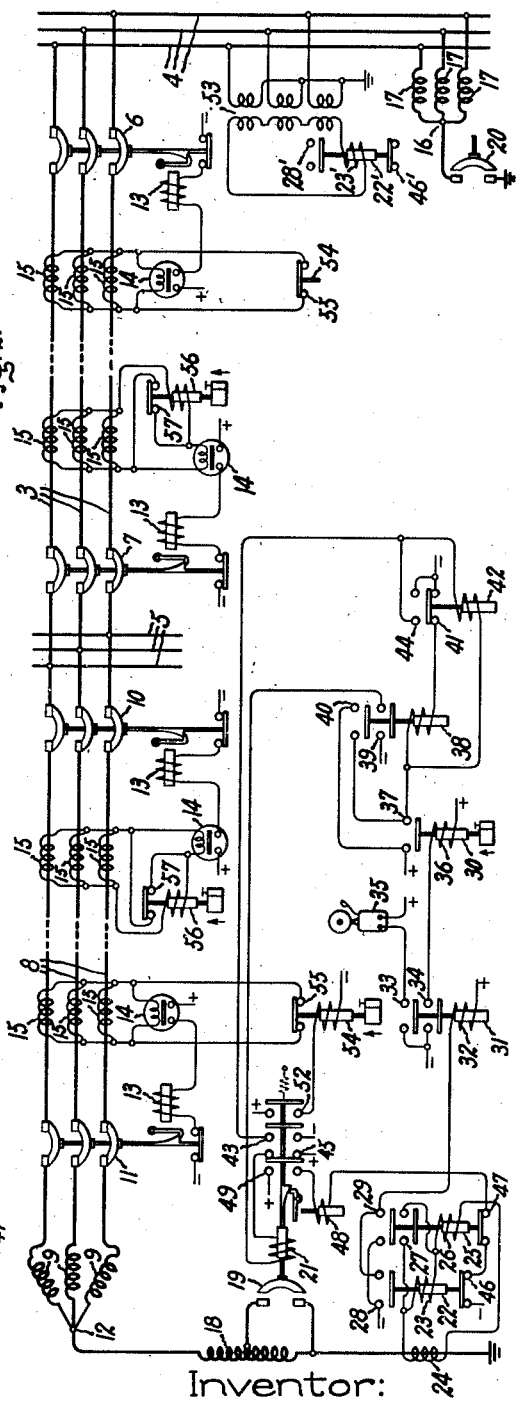

In the accompanying drawing Fig. 1 illustrates diagrammatically an embodiment of my invention as applied to the protection of a three-phase alternating current electric power system, and Fig. 2 illustrates diagrammatically a modification of the embodiment of my invention shown in Fig. 1.

For the purpose of illustrating my invention, I have shown it as applied to a three-phase electric power system which includes a power line 3, interconnecting two stations indicated by busses 4 and 5, through suitable circuit interrupting means such as latched closed circuit breakers 6 and 7. As shown, the system also includes another power line 8 interconnecting the station busses 5 and Y-connected windings 9 through suitable circuit interrupting means such as latched closed circuit breakers 10 and 11. The windings 9, which provide a neutral point 12, may be those of a power transformer or otherwise at some suitable point of the system. The power lines 3 and 8 are shown partly in broken lines merely to give a concept of distance. It will, of course, be understood that the power system may include other stations associated with power lines extending from the portion of the system illustrated, but I have shown only as much of the system as is necessary to an understanding of my invention.

For controlling the opening of the circuit breakers 6, 7, 10 and 11 through their trip coils 13, suitable relaying means responsive to ground faults are provided. As illustrated, these relaying means comprise simple overcurrent relays 14. These may be of the induction disk time limit type, examples of which are well known to the art. For more selective action, the ground fault responsive relays may be of the two-coil directional type, examples of which are also well known to the art. For response to ground faults, the relays 14 may be connected to be energized in accordance with the sum of the currents in the line conductors at the relay location. One way in which this may be done is to connect the windings of the relays across parallel connected current transformers 15.

The neutral point 12 of the winding 9 may be used for grounding purposes. Other neutral points suitably derived may be similarly used. Thus at station 4 the neutral point 16 may be established by the Y-connected windings 17. The neutral points 12 and 16 are, in accordance with my invention, arranged to be connected to ground to establish that grounding of the system on which the prearranged settings of the ground fault relays 14 are based so as to insure the desired selectivity of relaying operation.

Inasmuch, however, as it is desirable to clear as many ground faults as possible without circuit breaker operation, at least one of the neutral points 12 is grounded through suitable arc suppressing apparatus, such as a ground fault neutralizer 18, after the manner and for the purpose disclosed in the previously mentioned United States Letters Patent 1,537,371. Depending on the extent of the system and also whether or not it may at times be operated as a divided system, ground fault neutralizers may be provided at other points of the system. The ground fault neutralizer 18 is an inductance device whose zero phase sequence inductance is such as to provide, on the occurrence of a ground on a phase conductor of the system, a lagging current for effectively suppressing the capacitance current to ground at the fault. Where more than one neutralizer is provided on the system, the suppressing effect of each neutralizer will be sufficient to take care of a predetermined portion of the system, such portion being determined by the probable division of the system under different operation conditions. Then, when the whole system is in service, all of the neutralizers share in providing sufficient lagging current to neutralize the capacitance current to ground in case of a ground fault. For the purpose of illustrating my invention, it will be assumed that, upon the occurrence of a ground fault anywhere on the system shown, enough lagging current is caused to flow in the neutralizer 18 to neutralize the capacitance current to ground of the ungrounded phase conductors of the system so that the fault, if of a transient character, is cleared.

When the fault is not of a transient character, however, resort may be had to circuit breaker operation so as to isolate the faulty portion of the system without disturbing continuity of service on sound portions. It is then necessary to rely upon the ground fault relays 14, but their action, as heretofore pointed out, can only be selective for that predetermined grounding of the system for which prearranged relay settings are made. Accordingly, I arrange to effect this grounding a predetermined time after the appearance of a fault, in other words, after a time sufficient for the ground fault neutralizers to suppress the fault if of a transient character. Thus at the point where the ground fault neutralizer 18 is located, I arrange to establish a connection to ground around a portion of the neutralizer and at station 4 to establish a connection to ground from the neutral point 16. The portion of the neutralizer 18 around which the ground connection is established will depend upon the amount of impedance it is desired to have in the ground connection to provide the desired response of the ground fault relays 14. Similarly other grounding connections may include impedances, as desired, for selective ground fault relaying. These connections to ground may be established in any suitable manner, but I propose to accomplish them by closing normally open switching means 19 and 20 a predetermined time after the appearance of a ground fault.

For this purpose the switching means 19, which is illustrated as a latched closed type of circuit breaker having a closing winding 21, may have its closing operation initiated in response to the flow of the lagging current appearing in the neutralizer 18 on the occurrence of a ground fault on a phase conductor of the system. The closing impulse may be given by any suitable means such as a low set overcurrent relay 22 whose energizing winding 23 is connected to suitable means such as a current transformer 24 for energization in dependence on the current flowing in the neutralizer 18. Since, upon the closing of the switch 19, a much larger current tends to flow in the ground connection from the neutral point 12, I may provide, in order to save the winding 23, a high set overcurrent relay 25 which has an energizing winding 26 and a pick-up or setting just below the thermal limit of the winding 23. This high set relay 26 is provided with circuit closing contact 27 which are arranged to short-circuit the winding 23 upon operation of the relay 26.

For giving the switch impulse, the low set relay 22 is provided with circuit closing contacts 28 and in order not to annul the functions of the relay 22, the high set relay 25 is also provided with circuit closing contacts 29 connected in parallel with the contacts 28. The desired time interval after the response of the low set relay 22 for the neutralizer 18 to accomplish its fault suppressing function may be secured by a time delay relay 30. Where more than one of these are used on a system, it is important that their operating times do not differ so much that any grounding switch can close before all have been given the closing impulse. The time delay relay 30 may be of any suitable type, examples of which are well known to the art. As illustrated, it is a normally deenergized circuit closing relay, and while it may be energized directly in response to the operation of the low set relay 23, it is sometimes desirable to have an instantaneous operation for alarm and other purposes. Accordingly, I have shown an intermediate auxiliary relay 31 whose winding 32 is connected in series with the parallel connected contacts 28 and 29 and which is provided with circuit closing contacts 33 and 34 respectively connected in the circuit of an alarm device 35 and the winding 36 of the time delay relay 30.

In order to avoid more than one closing operation of the switch 19 for any one fault, I arrange to have the timing relay 30 control, through its circuit closing contacts 37, a closing relay 38. Through its circuit closing contacts 39, this relay completes the circuit of the switch closing coil 21. The relay 38 is also arranged to seal itself in by its circuit closing contacts 40 in parallel with the timing relay contacts 37 and to remain energized until its circuit is broken by the circuit opening contacts 41 of a control relay 42 which is energized upon closing of the switch 19 in consequence of the closing of the a auxiliary switch contacts 43 thereof. When energized, the control relay 42 seals itself in through its circuit closing contacts 44 in series with the parallel connected contacts 37 and 40 so that, unless both of these have been released, that is, the fault cleared, the switch 19 cannot be reclosed. The circuit of the closing coil 21 may be interrupted by b auxiliary switch contacts 45.

In order to insure immediate opening of the switch 19 upon clearance of a fault by the ground fault relay 14, the relays 22 and 25 may be provided with circuit opening contacts 46 and 47, respectively, which are connected in series with the trip coil 48 of the switch 19 and a auxiliary switch contacts 49. Thus, when fault current ceases to flow in the grounding connection while the switch 19 is closed, both of these relays drop out and close their contacts 46 and 47. The circuit of the trip coil 48 is completed to trip the switch 19 and then opened at the a auxiliary switch contacts 49 when the switch opens.

In order to effect the opening of the switch 19 after the neutralizer 18 and ground fault relays 14 have failed to clear the fault after a time sufficient for them to have functioned, I provide a time delay relay 50 whose coil is energized through a auxiliary switch contacts 52 and whose circuit closing contacts 51 complete the circuit of the trip coil 48 through a auxiliary switch contacts 49.

The closing and opening of the grounding switch 20 may be controlled in substantially the same manner as the switch 19 except for the fault responsive relays which initiate the operation. Thus at station 4 the closing operation may be initiated by a ground fault responsive relay 22' which has circuit closing contacts 28' for effecting the closing impulse and circuit opening contacts 46' for effecting the opening impulse after the manner of the relay 22 associated with the neutralizer 18. For ground fault response the relay 22' may have its energizing winding 23' connected to close the delta of a Y-delta connected potential transformer 53 which is energized from the busses 4. The remaining equipment at station 4 for controlling the switch 20, being essentially the same as that for the switch 19, requires no further description or illustration.

In order to avoid possible erroneous operation of the ground fault relays 14 because the grounding switches 19 and 20 fail to close practically simultaneously and also to prevent false operation of these relays while the neutralizer is having its opportunity to suppress the fault, I may arrange to prevent operation of the ground fault relays 14 until after the grounding switches have been closed. For this purpose I may provide at points equipped with grounding switches a time delay circuit opening relay 54 whose normally closed contacts 55 are arranged to short-circuit the winding of the ground fault relay 14 and which is energized on the closing of the switch 19 through a circuit containing the a auxiliary switch contacts 52. At points without grounding switches, such, for example, as station 5, the ground fault tripping relays 14 may be prevented from operating by suitable time delay ground fault responsive relays 56 which, as shown, are connected in circuit with the parallel connected current transformers 15 and which, through their circuit opening contacts 57, normally short-circuit the windings of the ground fault tripping relays 14. Thus, after a predetermined time sufficient for the neutralizer 18 to function and for all the grounding switches to be closed, the ground fault tripping relays 14 are freed for operation.

Assuming the parts positioned as shown in the drawing and also that a fault occurs to ground on one of the phase conductors of the line 3, as indicated by X, then the voltages to ground of the neutral points 12 and 16 are substantially the Y voltage of the system. Accordingly, lagging current flows in consequence of the neutralizer 18 to the grounded point X in an amount substantially equal but opposite in phase to the capacitance current to ground of the ungrounded conductors of the system. The flow of current in the neutral connection energizes the low set overcurrent fault detector 22 which closes its contacts 28 to energize the auxiliary relay 31 and thus start the timing action of the circuit closing time delay relay 30. Similarly the timing action of the ground fault current responsive relays 54 and 56 is started. Also the fault detector 22' at station 4 is energized to close its contacts 28' and thereby start the timing action at station 4 for closing the switch 20.

If the fault X is of a transient character such that the fault is quickly suppressed by the neutralizer 18, the low set relay 22 will reset to open its contacts 28 before the completion of the timing action of the relay 30. Similarly the relay 22' at station 4 will reset to open its contacts 28' and thus stop the timing impulse at station 4. Likewise the ground fault time overcurrent relays 54 and 56 will be deenergized to reset and close their contacts 55 and 57, respectively.

However, if the neutralizer 18 does not succeed in clearing the fault, the timing action of the relays 30, 54 and 56 continues. When the relay 30 completes its timing action to close its contacts 37, the closing relay 38 is energized and thereupon completes the circuit of the closing coil 21 through its contacts 39. At the same time the closing relay 38 seals itself in through its contacts 40 and the contacts 41 of the control relay 42. Upon the completion of the closing of the switch 19, the control relay 42 picks up to close its contacts 44 and seals itself in through the contacts 37 of the timing relay 30 since this relay is still energized. Accordingly, with the opening of the contacts 41 the closing relay 38 drops out and cannot be reenergized until the timing relay 30 is deenergized to open its contacts 37. This prevents more than one closing of the switch 19 for any one fault.

With the closing of the switch 19, the flow of ground fault current in the connection from the neutral point 12 to ground is increased. This causes the operation of the high set fault detector 25 which closes its contacts 27 to short-circuit the low set fault detector 22. Also the closing of the contacts 29 of the relay 25 maintains the circuit of the auxiliary relay 31 and thereby continues the energization of the timing relay 30. At other stations, such as 4, where neutral points, such as 16, are to be grounded, similar operation occurs except that neutralizers are not used at these other stations.

At the expiration of the time limit of the ground fault timing relays 54 and 56 when all of the grounding switches are closed, the short-circuits are removed from the ground fault relays 14 to permit them to respond and thereby effect the opening of their respectively associated circuit breakers. Immediately upon the opening of the circuit breakers, which in the case of the fault assumed would be the circuit breakers 6 and 7, the ground fault is thereby cleared and current ceases to flow in the neutral to ground connections. Consequently, the ground fault detectors 22, 25 and 22' are deenergized. Accordingly, at the point where the neutralizer is located, the closing of the contacts 46 and 47 of the low and high set fault detectors completes the circuit of the trip coil 48 whereby to effect the opening of the switch 19. Similarly at station 4 the drop out of the ground fault relay 22' results in the closing of its contacts 46' which effect the tripping of the switch 20 in a manner similar to that shown for the control of the switch 19. Upon the opening of the grounding switches, the system is then restored to the condition shown in Fig. 1.

In the event that the ground fault relays 14 or the circuit breakers controlled thereby for any reason fail to clear the ground fault at X, then, after a predetermined time, the time limit tripping relay 50, which is energized in response to the closing of the switch 19 through the $a$ auxiliary switch contacts 52 thereof, closes its contacts 51 to complete the circuit of the trip coil 48 through the $a$ auxiliary switch contacts 49. This effects the opening of the switch 19. Similarly the switch 20 will be opened at station 4. Thus, upon the opening of all the grounding switches, the system is restored to ground fault neutralizer operation whereby to limit the ground fault current and reduce the danger to the system so that operation may be continued until the fault is isolated or cleared by suitable manipulation of the circuit breakers of the system.

The embodiment of my invention shown in Fig. 2 is essentially the same as the arrangement shown in Fig. 1 except that I have omitted the feature of opening the grounding switches in the event that the ground fault relays 14 fail to effect the clearing of the fault. If they do clear the fault, then the trip coil 48 is energized through the $a$ auxiliary switch contacts of the grounding switch 19 and the contacts 46 and 47 of the low and high set ground fault relays 22 and 25 respectively, which drop out when current ceases to flow in the ground connection. The structure and operation of this embodiment of my invention are otherwise similar to those of the protective arrangement shown in Fig. 1 and will be obvious from the description thereof.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In an alternating current electric system of the type in which a fault to ground on one phase conductor of the system substantially increases the capacitance current to ground of the ungrounded phase conductors of the system, means for interrupting said system, relay means tending to effect the opening of said interrupting means on the occurrence of a ground fault on the system, arc suppressing means connected to said system and having a zero phase sequence inductance operative on the occurrence of a ground on a phase conductor of the system to provide a lagging current for effectively suppressing the capacitance current to ground at the grounded point, means operative after the flow of said lagging current for a predetermined time for substantially increasing the flow of ground fault current, and means for preventing the operation of said relay means until after the increased flow of ground fault current.

2. In an alternating current electric system of the type in which a fault to ground on one phase conductor of the system substantially increases the capacitance current to ground of the ungrounded phase conductors of the system, means for interrupting said system, relay means tending to effect the opening of said interrupting means on the occurrence of a ground fault on the system, arc suppressing means connected to said system and having a zero phase sequence inductance operative on the occurrence of a ground on a phase conductor of the system to provide a lagging current for effectively suppressing the capacitance current to ground at the grounded point, means operative after the flow of said lagging current for a predetermined time for substantially increasing the flow of ground fault current, means for preventing the operation of said relay means until after the increased flow of ground fault current, and means operative independently of the opening of said circuit interrupting means for reducing the flow of ground fault current to its initial value if said increased flow of ground fault current lasts a predetermined time after the operation of said current flow increasing means.

3. In an alternating current electric system having a neutral point and of the type in which a fault to ground on one phase conductor of the system substantially increases the capacitance current to ground of the ungrounded phase conductors of the system, an inductive reactance device connected between said neutral point and ground and having an inductance proportioned to provide on the occurrence of a ground on a phase conductor of the system a lagging current for effectively suppressing the capacitance current to ground at the grounded point, normally open switching means operative when closed to short-circuit a predetermined portion of said device, means for effecting a closing operation of said switching means, low set overcurrent relay means responsive to the current initially flowing in the connection between said neutral point and ground for starting the operation of said closing means, and high set overcurrent relay means responsive to the current flowing in said connection after the closing of said switching means for deenergizing said low set overcurrent relay.

4. In an alternating current electric system having a neutral point and of the type in which a fault to ground on one phase conductor of the system substantially increases the capacitance current to ground of the ungrounded phase conductors of the system, means for interrupting the system, ground fault responsive relay means tending to effect the opening of said interrupting means on the occurrence of a ground fault on the system, arc suppressing means connected between said neutral point and ground and having a zero phase sequence inductance operative on the occurrence of a ground on a phase conductor of the system to provide a lagging current for effectively suppressing the capacitance current to ground at the grounded point, means for establishing a relatively low impedance connection to ground from said neutral point after the flow of said lagging current for a predetermined time comprising a low set overcurrent relay responsive to said lagging current, and means for disestablishing said neutral to ground low impedance connection immediately after the clearing of a ground fault by said system interrupting means including said low set overcurrent relay and a high set overcurrent relay responsive to the current flowing in said low impedance connection.

5. In an alternating current electric system having a neutral point and of the type in which a fault to ground on one phase conductor of the system substantially increases the capacitance current to ground of the ungrounded phase conductors of the system, an inductive reactance device connected between said neutral point and ground and having an inductance proportioned to provide on the occurrence of a ground on a phase conductor of the system a lagging current for effectively suppressing the capacitance current to ground at the grounded point, normally open switching means operative when closed to short-circuit a predetermined portion of said device, means including a time delay device for effecting a closing operation of said switching means, low set overcurrent relay means responsive to the current initially flowing in the connection between said neutral point and ground for starting the timing operation of said time delay device, high set overcurrent relay means responsive to the current flowing in said connection after the closing of said switching means for deenergizing said low set overcurrent relay and maintaining said time delay device energized, and means controlled by said high and low set overcurrent relays for effecting the opening operation of said switching means upon cessation of current flow in said connection.

6. In an alternating current electric system having a plurality of neutral points and of the type in which a fault to ground on one phase conductor of the system substantially increases the capacitance to ground of the ungrounded conductors of the system, means for interrupting the system at a plurality of points thereof, relay means tending to effect the opening of said interrupting means on the occurrence of a ground fault on the system, arc suppressing means connected between a neutral point of the system and ground and having a zero phase sequence inductance operative on the occurrence of a ground on a phase conductor of the system to provide a lagging current for effectively suppressing the capacitance current to ground at the grounded point, means operative after the flow of said lagging current for a predetermined time to establish a relatively low impedance connection to ground from each of a plurality of the neutral points of the system, and means for preventing the operation of said relay means until after the low impedance grounding of said plurality of neutral points.

7. In an alternating current electric system having a plurality of neutral points and of the type in which a fault to ground on one phase conductor of the system substantially increases the capacitance to ground of the ungrounded conductors of the system, means for interrupting the system at a plurality of points thereof, relay means tending to effect the opening of said interrupting means on the occurrence of a ground fault on the system, arc suppressing means connected between a neutral point of the system and ground and having a zero phase sequence inductance operative on the occurrence of a ground on a phase conductor of the system to provide a lagging current for effectively suppressing the capacitance current to ground at the grounded point, means operative after the flow of said lagging current for a predetermined time to establish a relatively low impedance connection to ground from each of a plurality of the neutral points of the system, means for preventing the operation of said relay means until after the low impedance grounding of said plurality of neutral points, and means for disestablishing one of said neutral to ground low impedance connections immediately upon the opening of one of said system interrupting means.

8. In an alternating current electric system having a plurality of neutral points and of the type in which a fault to ground on one phase conductor of the system substantially increases the capacitance to ground of the ungrounded conductors of the system, means for interrupting the system at a plurality of points thereof, relay means tending to effect the opening of said interrupting means on the occurrence of a ground fault on the system, arc suppressing means connected between a neutral point of the system and ground and having a zero phase sequence inductance operative on the occurrence of a ground on a phase conductor of the system to provide a lagging current for effectively suppressing the capacitance current to ground at the grounded point, means for establishing a relatively low impedance connection to ground from each of a plurality of the neutral points of the system after the flow of said lagging current for a predetermined time, means for preventing the operation of said relay means until after the low impedance grounding of said plurality of neutral points, and means for disestablishing said neutral to ground low impedance connections immediately after the clearing of a ground fault by said system interrupting means.

9. In an alternating current electric system having a plurality of neutral points and of the type in which a fault to ground on one phase conductor of the system substantially increases the capacitance to ground of the ungrounded conductors of the system, means for interrupting the system at a plurality of points thereof, relay means tending to effect the opening of said interrupting means on the occurrence of a ground fault on the system, arc suppressing means connected between a neutral point of the system and ground and having a zero phase sequence inductance operative on the occurrence of a ground on a phase conductor of the system to provide a lagging current for effectively suppressing the capacitance current to ground at the grounded point, means for establishing a relatively low impedance connection to ground from each of a plurality of the neutral points of the system after the flow of said lagging current for a predetermined time, means for preventing the operation of said relay means until after the low impedance grounding of said plurality of neutral points, and means for disestablishing said neutral to ground low impedance connections immediately after the clearing of a ground fault by said system interrupting means and in a predetedmined time after the establishment of said connections if said system interrupting means fail to clear a ground fault.

ELBERT H. BANCKER.